United States Patent
Karper et al.

[15] 3,688,568
[45] Sept. 5, 1972

[54] VISCUROMETER

[72] Inventors: Paul W. Karper, Stow; John P. Porter, Cuyahoga Falls, both of Ohio

[73] Assignee: The B. F. Goodrich Company, New York, N.Y.

[22] Filed: July 28, 1970

[21] Appl. No.: 58,872

[52] U.S. Cl. ........................73/101, 73/15.6
[51] Int. Cl. ..................G01n 11/16, G01n 25/00
[58] Field of Search ..............73/101, 94, 15.6, 59

[56] References Cited

UNITED STATES PATENTS

| | | | |
|---|---|---|---|
| 3,538,758 | 11/1970 | Karper et al. | 73/101 |
| 3,534,594 | 10/1970 | Westlinning et al. | 73/101 |
| R26,562 | 4/1969 | Beatty et al. | 73/101 |
| 3,387,490 | 6/1968 | Wise | 73/101 |

*Primary Examiner*—Richard C. Queisser
*Assistant Examiner*—Marvin Smollar
*Attorney*—Joseph Januszkiewicz and W. A. Shira, Jr.

[57] ABSTRACT

A method and apparatus for determining the physical properties of vulcanizable elastomeric materials utilizing a cone-shaped oscillating rotor that is cooperative with a cone-shaped cavity in a stationary mold section whereby a sample of material is confined therebetween and subjected to a confining pressure, as well as an oscillating shearing force. The walls of the test chamber are heated to a predetermined temperature during cure, while torque sensing means are connected to the input of the rotor to measure the variation in force required to oscillate such projection. Means are provided to maintain a programmed confined pressure which increases linearly during the cure cycle permitting gradual closure of the stator and rotor rubber filled cavity compensating for any shrinkage of the sample. A recorder is connected to the torque sensing device to record the variations in shearing strain.

16 Claims, 8 Drawing Figures

INVENTORS
PAUL W. KARPER
JOHN P. PORTER
BY Joseph Januszkiewicz
ATTY.

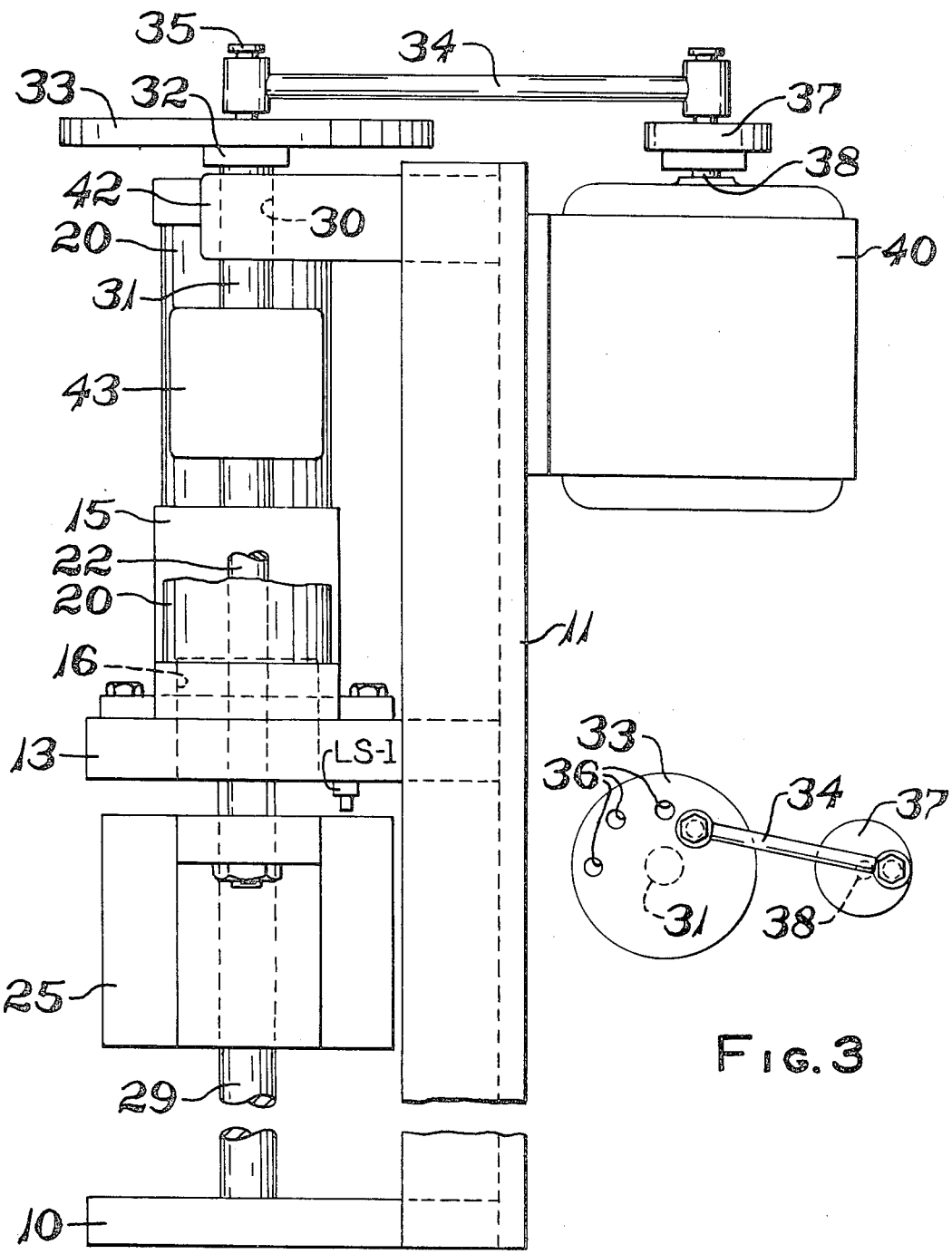

VISCUROMETER

BACKGROUND OF THE INVENTION

This invention relates to a method and test instrument of the viscurometer type which has refined control means which provides a test result of a cure curve that compensates for the shrinkage within a test sample during cure.

In the manufacture of articles made of elastomeric material, as well as in the research of these materials, it is necessary to determine the rate, extent of vulcanization and cure curve of these materials in order to provide the processing engineer with accurate data and parameters for the manufacture of these articles. It is necessary to provide an accurate cure curve from which scorch time, reversion and optimum cure time are obtained in order to accurately predict the heat history of the compound within accurate processing limitations. Heretofore test instruments employed in obtaining cure curves failed to effectively take into account excessive flow and/or shrinkage within the sample during cure. This is particularly significant since shrinkage alters the cure curve. A test instrument not able to detect or compensate for shrinkage, could provide output data which would indicate a point of maximum cure, when, in actuality, the sample of material had not yet reached its full cure. With such results, shrinkage would provide spurious results and a processing engineer would improperly set his processing parameters. To minimize shrinkage by making the sample of material smaller could materially affect the accuracy and one would not be able to obtain the necessary reliable data for precise laboratory testing. To reduce the amplitude of stroke does not rectify the error as it reduces the sensitivity of the instrument which impairs its accuracy. Applicant's invention fully recognizes the slippage phenomena and accurately records and depicts the cure curve, even though shrinkage occurs within the sample by so constructing the instrument as to maintain a true output which accurately depicts the cure curve of the sample of material. By optimum cure time is meant the time to cure the compound at a given temperature to give some optimum physical properties. Scorch time refers to the time of the onset of cure at a given temperature. In order to properly establish controls over the manufacturing of items of elastomeric material, it is necessary to provide a test instrument that is reliable, versatile, sensitive and operative to quickly and accurately predict the true cure curve of a sample, taking into account shrinkage, and which instrument is able to accurately record the capability of the processing compound.

SUMMARY OF THE INVENTION

The present invention provides a method and test instrument which accurately measures the dynamic properties of elastomeric material and which records such properties as a cure curve.

The present invention contemplates the use of a pair of spaced members which are cooperative to define a double coned receptacle for the reception of a test sample with one member stationary and the other member being oscillated to provide a shearing force on the sample and with means provided to maintain a programmed pressure between the spaced members which maintains intimate contact with the sample at all times.

BRIEF DESCRIPTION OF THE DRAWINGS

FIG. 2 is a side elevational view of the test instrument.

FIG. 3 is a plan view of the connection between the drive wheels for oscillating the rotor.

DETAILED DESCRIPTION

Figure 1:
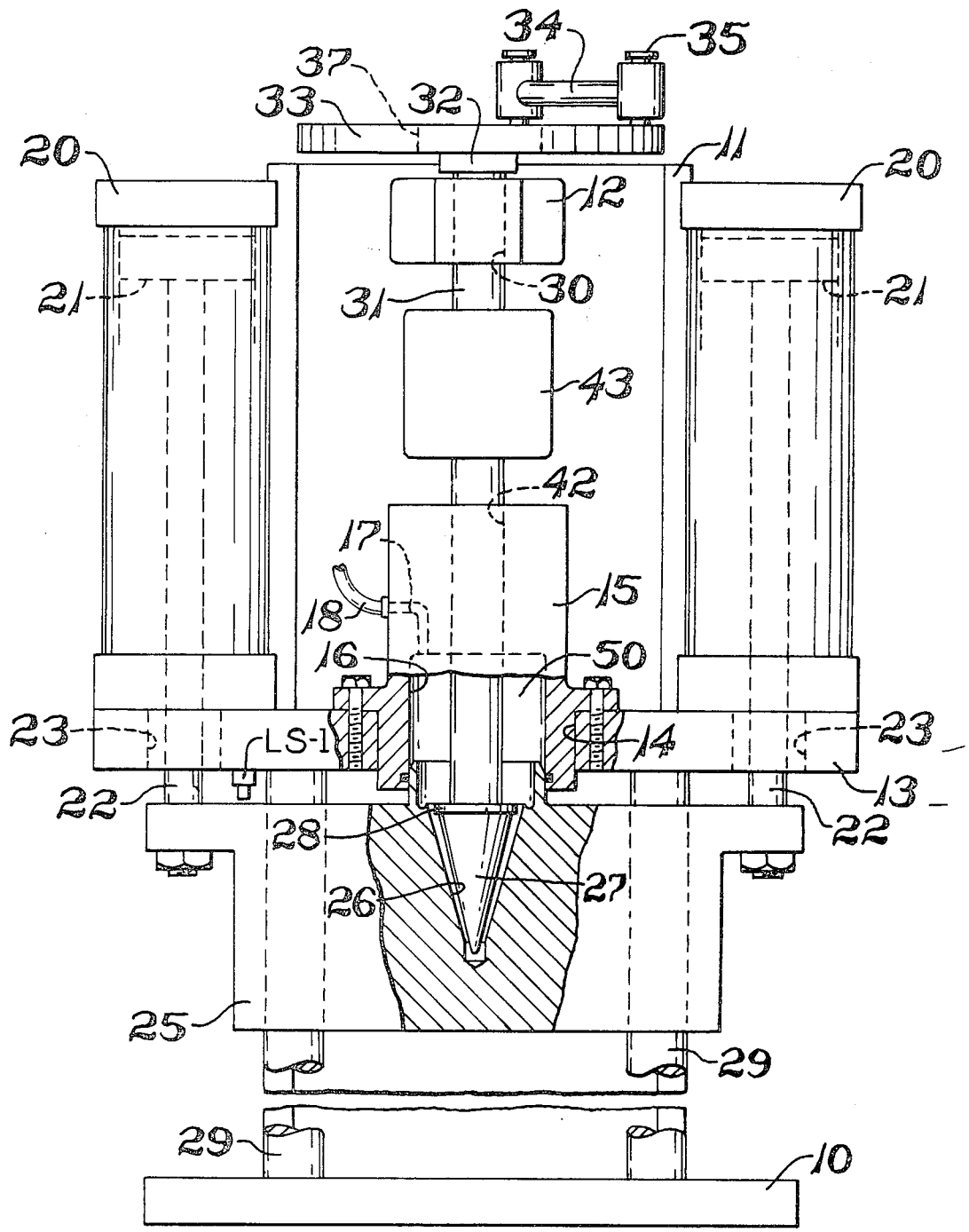
FIG. 1 is a front elevational view of the test instrument with a portion thereof shown in cross section.

Referring to the drawings wherein like reference characters designate like or corresponding parts throughout the several views, there is shown in FIG. 1 a base plate 10 having attached to its rear end portion an upwardly extending back plate 11. Back plate 11 has an upper bracket 12 and a lower elongated bracket 13 secured respectively to the upper end and intermediate portion thereof. Bracket 13 has a bore 14 located in the central portion thereof to receive a cylindrical member 15, which member 15 has a cylindrical recess 16 with a conduit 18 which is adapted to be connected to a suitable pressure source. Secured to the respective end portions of bracket 13 are cylinders 20 which have pistons 21 and downwardly extending piston rods 22 respectively extending through bores 23 in the respective end portions of such bracket 13 for connection to a stator member or carrier member 25. Carrier member 25 has a conically shaped serrated recess or cavity 26 at its center portion which is adapted to receive a cone-shaped serrated rotor 27 for a purpose to be described. Rotor 27 has a lip 28 on its base portion for cooperation with the base of recess 26 to define a substantially closed cavity with a restrictive passageway thereby. Rotor 27, and lip 28, cooperate with the cylindrical recess 16 of cylindrical member 15 to define a pressure dome 50 that is adapted to communicate with the cavity defined by recess 26 and rotor 27. Carrier member or stator member 25 is guided in its vertical upward and downward movement by a pair of spaced guide rods 29 which are secured to a base plate 10 and bracket 13 respectively. Upper bracket 12 has a central bore 30 which rotatably receives a shaft 31 journalled in a bushing 32 for connection to a wheel member 33 for rotation therewith. As shown in FIGS. 2 and 3, one end of a crank member 34 is pivotably mounted by means of a movable pin 35 to wheel member 33. As seen in FIG. 3, wheel member 33 has a plurality of pin-receiving index holes 36, each at a different radial spacing from the vertical axis of wheel 33. An eccentric drive wheel 37 is mounted on an output shaft 38 of a variable speed motor 40. The other end portion of crank member 34 is pivotably mounted to such eccentric drive wheel 37 to transfer the rotational movement of shaft 38 to an oscillating motion in wheel 33 and shaft 31. The amplitude of the oscillation of wheel 33 is dependent upon the particular mounting of pin 35 in index holes 36 of the wheel 33, while the frequency of oscillation is dependent upon the output speed of the variable speed motor 40. If desired, such variable speed motor may be connected to suitable transmission means which in turn may control the speed of the output shaft 38. However, for simplicity of illustration, motor 40 is shown as directly connected to the output shaft 38.

Shaft 31 extends downwardly through a central bore 42 in cylindrical member 15 for connection to the cone rotor 27 to provide the oscillation thereto. Mounted on shaft 31 is a torque cell or torque sensing pickup device 43 which responds to torque forces in shaft 31 to provide an input to a peak picker circuit, designated generally as 45 via electrical lines 46 and 47. Such circuit is disclosed in U.S. patent application Ser. No. 774,958 filed Nov. 12, 1968, which circuit is incorporated herein by reference. The oscillating shearing forces developed on the sample of material are cyclically varying and generally sinusoidal in nature and the peak picker circuit which includes a memory circuit provides an output signal that is conveyed as a substantially linear signal via electrical lines 48 and 49 to recorder 51. Recorder 51 has a suitable pen which graphically draws on its chart the torque values as a function of time, depicted by FIGS. 6 and 7. Such pickup device 43 may comprise a bonded resistance wire strain gauge, well known in the art and, therefore, neither illustrated nor described, wherein such wire gauges are bonded to the shaft 31 in such a position and are so connected into a bridge circuit, that they cancel the effects of bending and thrust strains, while adding the effects of torsional strain, with the relation between bridge unbalance and torsional strain being linear. Such pickup devices are manufacture by the Baldwin-Lima-Hamilton Corporation, located in Waltham, Mass., and being known as type B torque pickup. Such devices are also manufactured by Lebow Associates, Inc., located in Oak Park, Michigan; and being known as model 2102-200.

Figure 4:
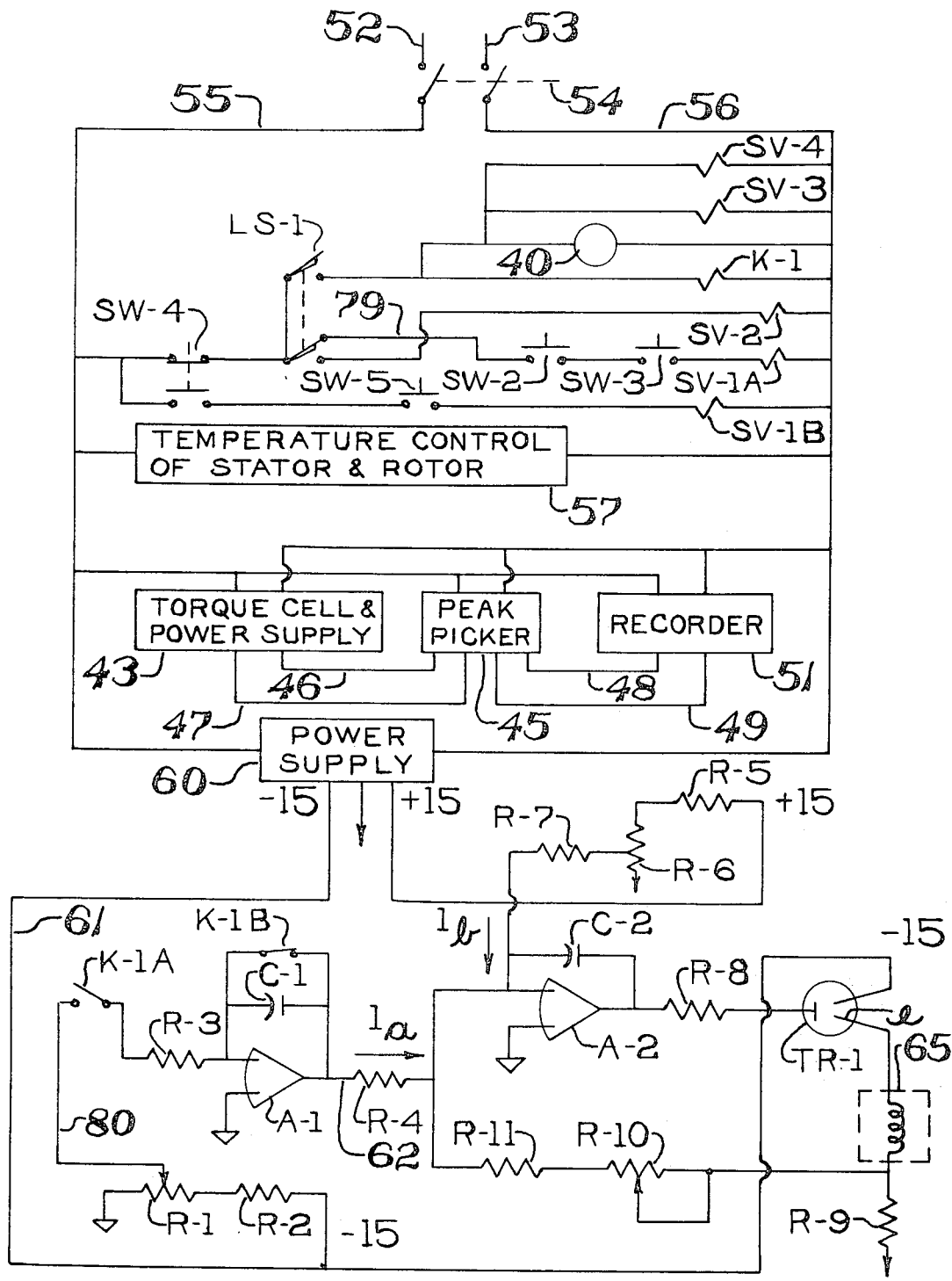
FIG. 4 illustrates the electrical control circuit for the test instrument.
Figure 5:
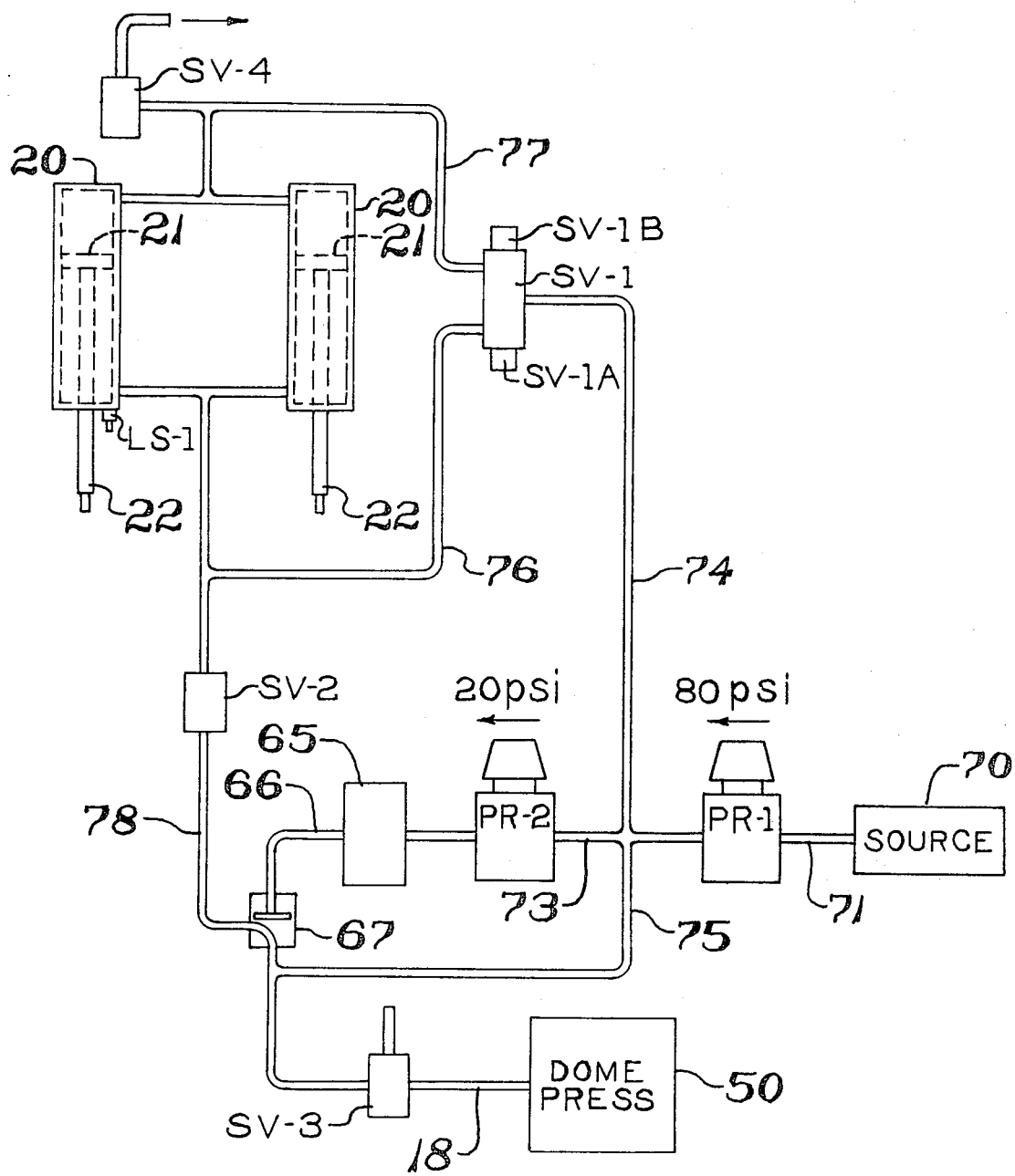
FIG. 5 illustrates the hydraulic circuit for the test instrument.

The electrical power for the control operation is supplied by the electrical lines 52 and 53 which are connected to a source of electrical power not shown. A double pole, single throw switch 54 connects lines 52 and 53 to main control lines or conductors 55 and 56 which lead to the torque pickup recorder 51, as well as the temperature control means 57. Suitable branch lines not shown are provided to supply current from the control means in a manner well known in the art to regulate the heating coils for the rotor 27 and the carrier member 25 to maintain a preselected temperature on the sample located between the cone-shaped cavity 26 and the cone rotor 27. Power is supplied from main control lines 52 and 53 via lines or conductors 55 and 56 to power supply unit 60 which provides power via conductor 61 for an integrator and control circuit consisting of amplifier A-1, relay K-1, with contacts K1A and K1B, capacitor C-1, resistors R-1, R-2 and R-3. The output of the integrator control circuit is conducted via conductor 62 to a current control circuit consisting of an amplifier A-2, transistor TR-1, capacitor C-2 and resistors R-4, R-5, R-6, R-7, R-8, R-9, R-10, R-11. An electric-to-pneumatic transducer 65 is shown in FIG. 4 and FIG. 5 as interposed between the resistor R-9 and the emitter e of transistor TR-1. Electric-to-pneumatic transducer 65 transmits a pneumatic output signal (FIG. 5) via conduit 66 to a booster relay 67, which output signal is proportional to a D.C. milliampere input signal from transistor TR-1. The transducer 65 receives an electrical signal and transfers such output signal into a pneumatic output. Such devices are available commercially as from Moore Products Company, Spring House, Pennsylvania. The transducer 65 is a force-balance instrument, wherein the force of the output pressure balances the force produced on the output coil of the input current and a permanent magnet field such as to transfer a minute input in the range of 4–20 milliamps to a 3–15 psi pneumatic output in the example to be illustrated.

FIG. 5 illustrates the pneumatic control system wherein cylinders 20—20 control the closing pressure of the stator member 25 on the sample of material confined between cavity 26 and rotor 27 as well as programmed pressures thereon in a manner to be described.

A source of pressurized fluid is conducted from a source indicated generally as 70 via conduit 71 to a pressure regulator valve PR-1 which can be set to provide a predetermined line pressure in conduits 73, 74 and 75. For purposes of illustration, the line pressure in conduit 73 is set at 80 psi. Conduit 75 is connected via solenoid controlled valve SV-3 to pressure dome 50. Conduit 74 is connected via solenoid operated valve SV-1 either to pressurize the rod end of cylinders 20 via conduit 76, or to exhaust via conduit 77 and solenoid operated valve SV-4. Conduit 73 is connected to a pressure regulator valve PR-2 whose output is set at 20 psi. The output of pressure regulator valve PR-2 is conducted to electric-to-pneumatic transducer 65 whose output is conducted to booster relay 67 via conduit 66. Booster relay 67 multiplies the pressure output from transducer 65 by a factor of six times, such that the output (18–90 psi) from booster relay 67 to conduit 78 is six times the output pressure (3–15 psi) from transducer 65. Conduit 78 controls the pressurization of the rod end of cylinders 20 via solenoid operated valve SV-2. Solenoid operated valves SV-4, SV-3 and SV-2 as well as energization of relay K-1 and motor 40, are controlled by limit switch LS-1 (FIGS. 1, 2, 4 and 5) and switch SW-4. Limit switch LS-1 is set to be actuated at approximately 0.030 inches of mechanical closure of cone-shaped rotor 27 within cone-shaped recess 26. Prior to closure of limit switch LS-1, power line 55 is connected via line 79 through normally open switches SW-2 and SW-3 to the solenoid SV-1A of solenoid operated valve SV-1. Upon closure of switches SW-2, SW-3 and energization of solenoid SV-1A, valve SV-1 directs the pressurized fluid from source 70 to pressurize the rod end of cylinders 20. Solenoid SV-1B of valve SV-1 is energized by depressing or actuating switch SW-4 which connects power line 55 via depressed switch SW-5 which action connects the pressurized source via conduit 74 and 77 to the head end of cylinders 20.

The temperature control circuit for the stator 25 and rotor 27 are conditioned for operation along with the circuit for the recorder 51, peak picker circuit 45 and the torque cell 43 by closing switch 54.

With the rotor 27 separated and spaced from the cone-shaped cavity 26, the operator inserts a sample of material to be tested into the test cavity 26. The operator then depresses the push buttons for switches SW-2 and SW-3 to energize solenoid SV-1A which connects the pressure source 70 via conduit 71 through pressure regulator valve PR-1 ( which is set at 80 psi) thence via conduit 74 to solenoid operated valve SV-1 which directs the pressurized fluid to the rod end of cylinders 20 via conduit 76. Such action moves the carrier member 25 upwardly towards a closing position, until limit switch LS-1 is actuated. The closing pressure, which is referred to as the primary pressure or first pressure, is set at 80 psi ( of the example chosen) and is of sufficient value to effect a shaping and molding of the sample to the shape of the mold and mold cavity. Prior to the actuation of limit switch LS-1, relay K-1 is in the de-energized condition maintaining the voltage out of the integrator at zero voltage. The variable resistor R-6 is adjusted to provide a current through the transducer 65 which will result in an initial secondary pressure or a second pressure of 35 psi in conduit 78. Upon actuation of limit switch LS-1, solenoid SV1A is de-energized while solenoids of valves SV-2, SV-3, SV-4 and relay K-1 are energized. Energization of solenoid operated valve SV-3 connects the pressurized fluid from source 70 and pressure regulator valve PR-1 to the dome chamber 50 which establishes dome pressure to prevent porosity during cure. As an example, the dome pressure is set at 60 psi in the example chosen. Energization of solenoid operated valve SV-4 connects conduits 76 and 77 to exhaust, while energization of valve SV-2 connects the pressure source 70 via conduits 71, 73 and 75 to booster relay 67 which directs the pressure fluid via line 78, through valve SV-2 to the rod end of cylinders 20 at a reduced pressure as controlled by the secondary preset pressure of 35 psi set by transducer 65 and relay 67. With the energization of relay K-1, switch K1A is closed which in turn completes the circuit to the integrator circuit which in turn will control the output of the electric-to-pneumatic transducer 65 which in turn controls the amount which booster 67 increases the line pressure therethrough to cylinders 20, which is referred to as the secondary or second pressure which is to increase linearly. The pneumatic output of transducer 65 is proportional to the controlled input signal from the integrator circuit. As an example, the 4 to 20 milliamps input range of the integrator circuit controls a 3–15 psi pneumatic output from transducer 65 for conduction to the multiplier or booster relay 67. Such action will provide for a programmed increasing pressure, a continuous increase in secondary pressure.

Figure 8:
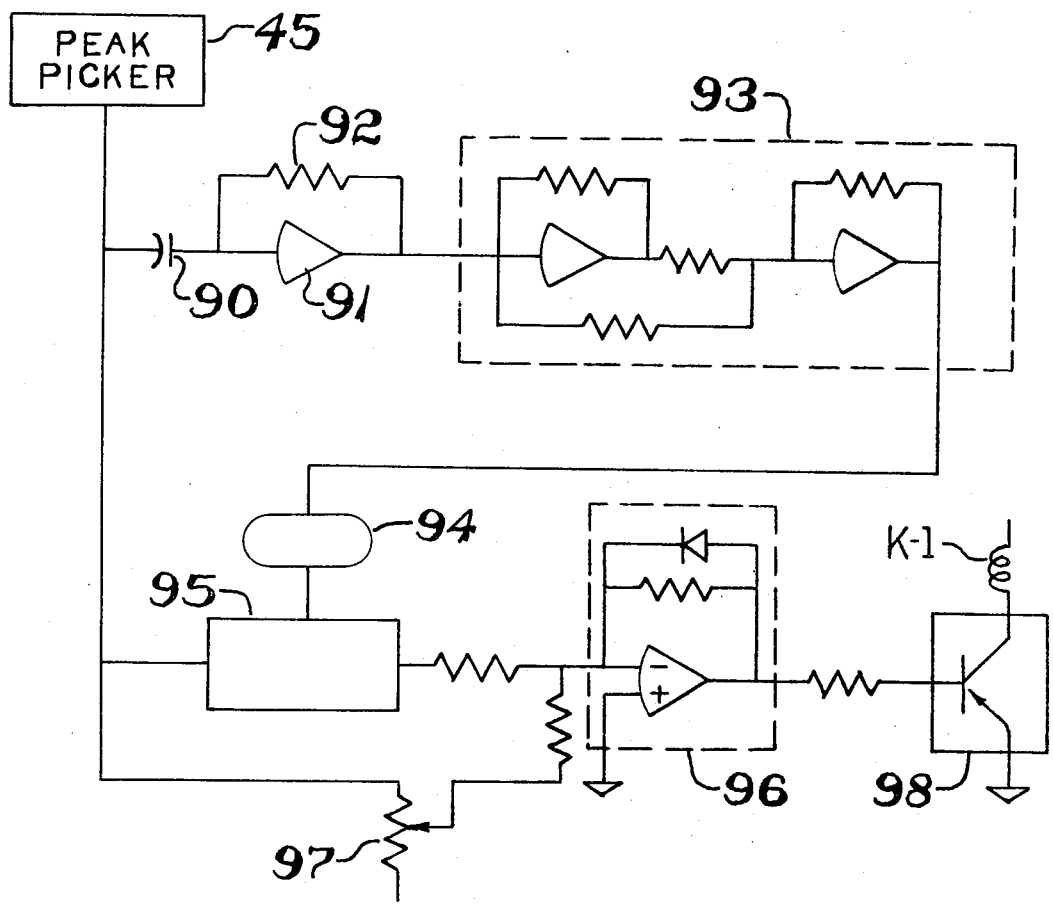
FIG. 8 illustrates an electrical control circuit for modifying the circuit of FIG. 5 wherein the scorch point initiates programmed pressure.

Thus, prior to the closing of the rotor 27 on the test sample, the primary pressure was 80 psi; however, on the closing of the rotor on the test sample in cavity 26 to approximately 0.030 of an inch of complete closure, the cylinders 20 exert a pressure as determined by the current input to transducer 65 and its control of relay 67 which is 35 psi, the secondary pressure. The 35 psi, secondary pressure, may be extended for a controlled period of time such as 3 minutes by having relay K-1 operating in conjunction with a time delay relay to delay the programmed pressure initiation or automatically as a function of scorch point as shown in FIG. 8. With relay K-1 actuated, contact K1A is closed and contact K1B is opened, whereby contact K1A connects the power supply 60 to the input line 80 of the integrator circuit. The applied voltage to the integrator circuit is a function of the setting on the resistance R-1 and resistor R-2, which acts as a potentiometer or voltage divider circuit. Output voltage of amplifier A-1 is the integral of the voltage as a function of time. With a constant input voltage, the voltage output is linear as a function of time. With the opening of normally closed contact K1B, the integrator circuit becomes operative whereby a current $I_a$ flows through resistor R-4 towards the summing junction in amplifier A-2. The current $I_b$ through resistor R-7 is summed with $I_a$ and inverted by amplifier A-2. The output voltage of amplifier A-2 increases in opposite polarity to the applied voltage on resistors R-4 and R-7 until the current through resistors R-11 and R-10 is equal to the current through R-4 and R-7 which is equal to $I_a + I_b$. To accomplish this stable condition, the output voltage of amplifier A-2 is applied to resistor R-8, resulting in a current being supplied to the base of transistor TR-1 which transistor TR-1 is connected in an emitter follower configuration to provide a current gain. The feedback to amplifier A-2 is established by the voltage applied to resistor R-9 which is a function of the current through the coil of the electric-to-pneumatic transducer 65 (FIGS. 4 and 5). Resistors R-10 and R-11 provide the feedback current path to the summing junction of amplifier A-2. Current flows from the common terminal of the power supply 60 through resistor R-9, the coil of transducer 65 and the emitter to the collector of transistor TR-1 until the voltage across resistor R-9 is sufficient to provide the required current through resistors R-10 and R-11. Thus, the current through the coil of transducer 65 is a function of the output voltage of the integrator and the initial condition set up by variable resistor R-6. In a typical example, the current range of the coil of transducer 65 is 0.004 amps to 0.020 amps; with the pneumatic output of transducer 65 being 3 to 5 psi; and the output range of booster relay 67 being 18 to 90 psi. With the integrator circuit actuated, the secondary pressure increases linearly from 35 psi to a secondary pressure of 90 psi in 15 minutes in the typical example presented. It is to be understood that the pressures can be programmed to begin at preselected different pressure, with the linear slope such as to achieve a final secondary pressure that is different than 90 psi, as well as change the time interval to achieve the final secondary pressure. With the initiation of the test cycle and the secondary pressure of 35 psi being maintained for a preset time which in the example may be for 3 minutes, relay K-1 is actuated to start the pressure programmed circuit. The use of the term programmed pressures is for a logically consistent sequence of increasing pressures.

Figure 6:
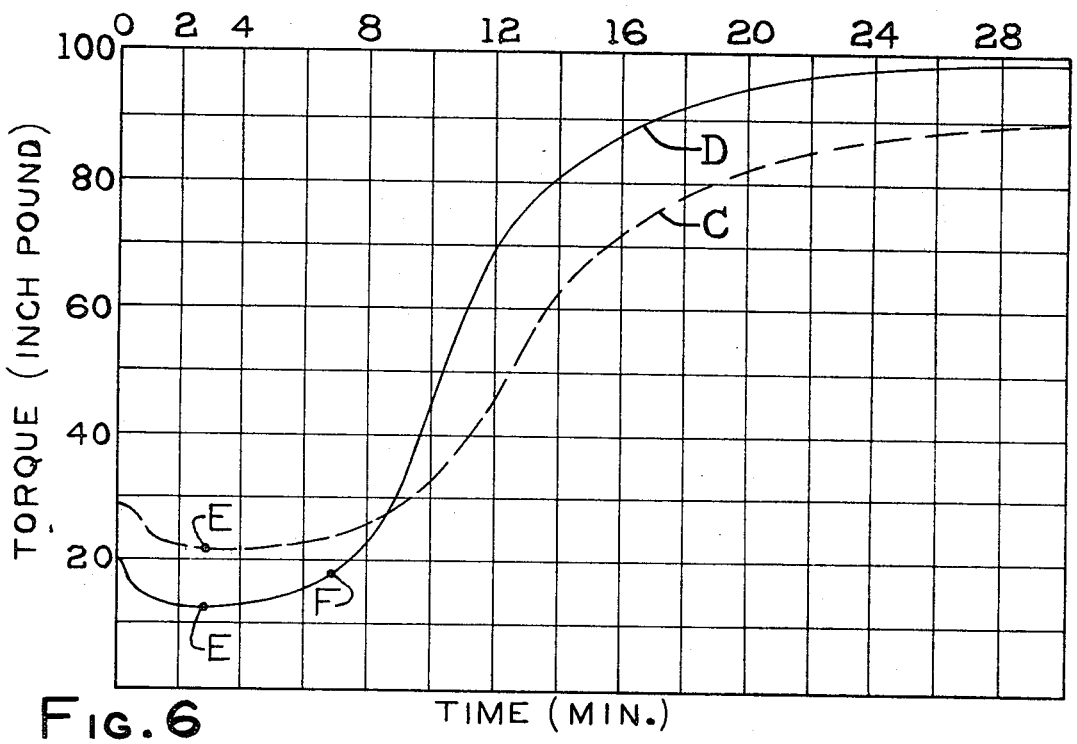
FIG. 6 is a chart illustrating the output of the torque cell as modified by the control circuit.

FIG. 8 illustrates the circuit modification of FIG. 4 wherein the scorch point is used to energize relay K-1 to perform the same function as the circuit of FIG. 4. Herein the voltage-time signal from the peak picker circuit 45 is connected to a differentiating circuit which includes capacitor 90, amplifier 91 and resistor 92. A voltage output results from amplifier 91 except when the rate of change is zero, which in FIG. 6 is point E, minimum torque from which point the scorch point is to be determined. For the example shown the scorch point is set at 3 units above minimum torque value, which in FIG. 6 on curve D is approximately 19 inch pounds of torque occurring at 7 minutes, designated as point F. The voltage from the differentiating circuit is applied to a zero cross-over detector 93. When a signal from the zero cross-over detector 93 indicates a zero cross-over is present, gate 94 has a signal output to cause the sample hold circuit 95 to operate. The voltage-time signal is put in memory.

A signal comparitor 96 compares the voltage from the sample hold circuit 95 with the continuous voltage time signal. Voltage divider 97 attenuates this signal to establish the arbitrary scorch point value, which in the example above is 3 units of torque above minimum value of torque. When the voltage from voltage divider 97 exceeds that from the sample hold circuit 95, an output voltage occurs from the signal comparitor 96, turning on transistor 98 to energize relay K-1 and thereby initiate the programmed pressure cycle as described in detail above.

Figure 7:
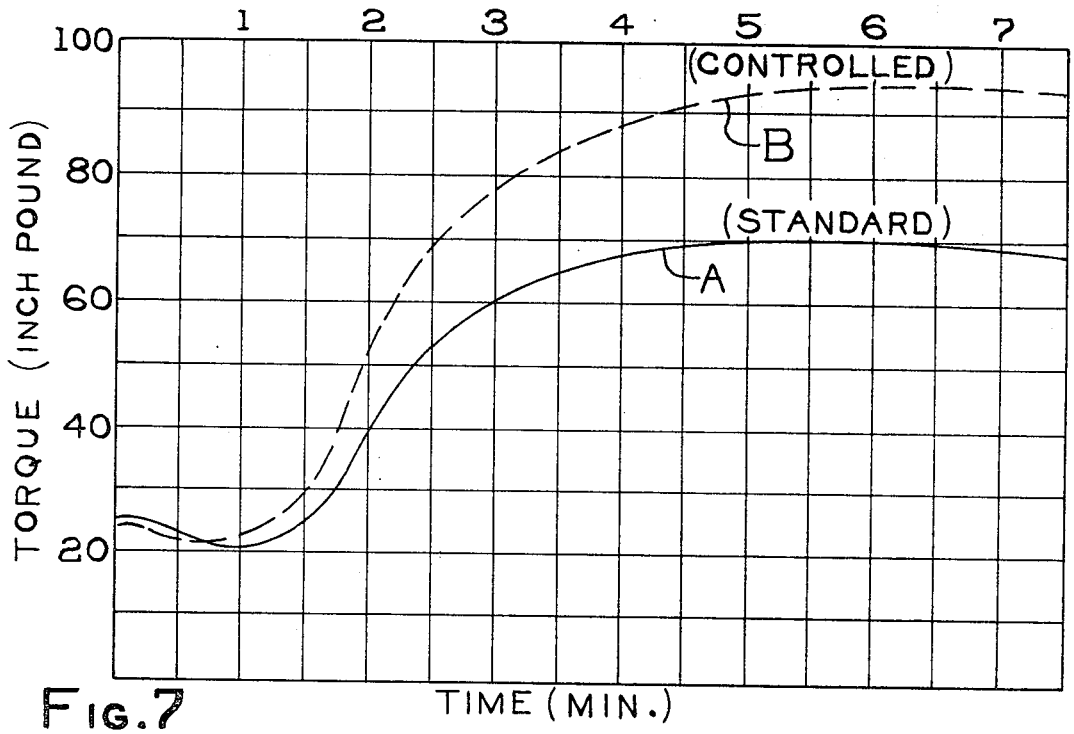
FIG. 7 is a chart illustrating the output of the torque cell showing a standard cure curve as A wherein the sample is subjected to a constant confining pressure and a controlled cure curve B wherein the output of the torque cell is modified by the control circuit.

FIG. 7 depicts the comparison of cure curves wherein the first sample was cured without the use of the pressure programmer (standard curve) and wherein such curve A had a primary closing pressure of 80 psi, which on closure was reduced to 46 psi and maintained at such pressure for the entire test cure. Such material was cured at 340° F. Curve A reaches a maximum at approximately 5.5 minutes after initiation of the test cycle giving a maximum torque reading of 70 inch pounds; whereas, a second sample (curve B) of the same material cured at 340° F. with the use of a pressure programmer described above wherein the secondary pressure of 36 psi is increased linearly at 4 psi per minute, the maximum torque developed is 94 inch pounds in 6.75 minutes. Thus, where it appears as in curve A that full maximum cure has been developed and that reversion has set in, it is disclosed by cure curve B that reversion in face has not set in. Thus, the margin of error is material. The further beneficial effect of maintaining pressure is that the steepness does not fall off as rapidly on Curve B as Curve A, thus providing for greater accuracy in measuring the different critical points on the cure curve. FIG. 6 illustrates cure curves C and D wherein there is provided a 3 minute delay before the pressure is linearly increased. Cure curve C has a primary pressure of 80 psi with a dome pressure of 60 psi and a secondary pressure of 36 psi. After a 3 minute delay, indicated as point E on curve C, the pressure is increased at the rate of 2 psi per minute until a maximum pressure of 82 psi is achieved, and thereafter the maximum pressure of 82 psi is maintained. Curve D has a flattening of the curve at approximately 98 inch pounds, and 95 percent of this gives an optimum cure of 93 inch pounds at 19 minutes from the initiation of the cycle.

CURE CURVE C

| Time Elapsed in Minutes | Gap change (in inches) between mold sections |
| --- | --- |
| 1 | 0.0 |
| 2 | 0.001 |
| 3 | 0.001 |
| 4 | 0.0015 |
| 5 | 0.002 |
| 6 | 0.003 |
| 7 | 0.005 |
| 8 | 0.007 |
| 9 | 0.0085 |
| 10 | 0.010 |
| 11 | 0.011 |
| 12 | 0.012 |
| 13 | 0.013 |
| 14 | 0.0135 |
| 15 | 0.014 |
| 16 | 0.0143 |
| 17 | 0.0145 |
| 18 | 0.0148 |
| 19 | 0.015 |
| 20 | 0.0152 |
| 21 | 0.0155 |
| 22 | 0.0159 |

Such data indicates that the gap does change between the respective mold sections and that with the linear increase in secondary pressure, the cure curve is effectively traced and compensates for shrinkage in the sample of material. Although curometers are good as control instruments to set limits in production, such instruments do not effectively compensate for shrinkage and do not provide necessary available data as a research instrument where one is attempting to determine the various critical points on a cure curve, wherein the compound is varied by as little as 5 percent with respect to a single ingredient. Under ordinary conditions of testing with the conventional instrument one would not be able to differentiate between these batches where there is a mere 5 percent difference in compounds. However, with the present instrument one is able to determine more accurately the scorch point and optimum cure point. The reason for the delay in the timing for the increasing in the pressure is to allow the rubber or the sample of material to soften sufficiently to accurately portray its softening and flow characteristics.

Although specific embodiments and a preferred mode of operation of the invention has been hereinbefore described, it is understood that the subject invention is not limited thereto since variations and modifications thereof can be made without departing from the principles of the invention.

We claim:

1. An apparatus for determining the physical properties of vulcanizable elastomeric material comprising a pair of die means cooperable to define a test sample receiving chamber with an annular opening between said die means and wherein said chamber receives a test sample, means connected to one of said die means for oscillation thereof to provide a shearing force on said sample in said test chamber, means operatively connected to said oscillating means for measuring said shearing force and providing an output signal therefrom, means to move the other of said die means relative to said one die means for cooperative engagement with the sample to maintain a pressure on said sample held between said die means; a pressure dome providing a closure for said opening between said die means, means to supply pressurized fluid to said pressure dome under controlled pressure to maintain a preselected fluid pressure on a test sample confined in said test chamber, means to heat said die means to a predetermined temperature, indicator means operative to receive said output signal for indicating its progressive value for use in analyzing said materials, and means operatively connected to said die moving means to provide a primary pressure and a secondary controlled linearly increasing programmed pressure.

2. An apparatus as set forth in claim 1 wherein said die means are cooperative to define a hollow cone cavity with a restrictive opening along the upper end portion of said hollow cone cavity, said die means are cooperative with a housing to define said pressure dome that communicates with said hollow cone cavity through said restrictive opening, and said means for providing said controlled programmed pressure includes a linearly increasing programmed pressure to a predetermined pressure.

3. An apparatus as set forth in claim 2 wherein time delay means are operatively connected to said means for providing said controlled program pressure to provide a preselected time interval after the initiation of said secondary pressure to provide for said linearly increasing pressure.

4. An apparatus for determining the physical properties of vulcanizable elastomeric materials comprising a pair of spaced die members cooperable to define a test chamber and hold a sample of material therebetween; oscillating means operatively connected to one of said die members for oscillating said one die member relative to the other die member to provide a shearing force on said sample received by said test chamber; measuring means operatively connected to said oscillating means for measuring said shearing force and providing an output signal therefrom; means to heat said die members to a preselected temperature; means operative to receive said output signal for indicating its progressive value; air cylinder means operatively interconnecting said die members to move said other die member toward said one member into cooperative engagement with a test sample held in said test chamber to provide a pressure thereon, control means connected to said air cylinder means to provide a primary pressure followed by a secondary pressure wherein said secondary pressure is different than said primary pressure; and said secondary pressure is a programmed to linearly increase to a predetermined pressure.

5. An apparatus for determining the physical properties of vulcanizable elastomeric material as set forth in claim 4 wherein said control means includes circuit means for providing a linearly increasing output signal, and booster means operative to receive said output signal and provide as said secondary pressure a controlled increasing air pressure input to said air cylinder means to provide said linear increasing pressure to a sample held in said test chamber during said secondary programmed pressure.

6. An apparatus for determining the physical properties of vulcanizable elastomeric materials as set forth in claim 5 wherein said circuit means has a time delay means for holding said secondary pressure at a constant pressure for a predetermined time interval and thence linearly increasing said secondary pressure to said predetermined pressure.

7. An apparatus for determining the physical properties of vulcanizable materials as set forth in claim 6 wherein said increasing pressure is set to reach a predetermined maximum pressure.

8. An apparatus for determining the physical properties of vulcanizable materials as set forth in claim 7 wherein said time delay means delays the initiation of said linearly increasing output signal until scorch point is reached.

9. An apparatus for determining the physical properties of vulcanizable elastomeric materials comprising a pair of spaced die members cooperable to define a test chamber and hold a sample of material therebetween; oscillating means operatively connected to one of said die members for oscillating said one die member relative to the other die member to provide a shearing force on said sample received by said test chamber; measuring means operatively connected to said oscillating means for measuring said shearing force and providing an output signal therefrom; means to heat said die members; means operative to receive said output signal for indicating its progressive value; air cylinder means operatively interconnecting said die members to move said other die member toward said one member into cooperative engagement with a test sample held in said test chamber to provide a pressure thereon, control means connected to said air cylinder means to provide a primary pressure followed by a secondary pressure operative on said air cylinder means, and said control means includes circuit means for maintaining said secondary pressure at a constant pressure followed by a linearly increasing pressure to a predetermined pressure, and said circuit means including means responsive to a minimum torque output signal from said output signal to actuate said linearly increasing pressure following a preset time interval.

10. An apparatus for determining the physical properties as set forth in claim 9 wherein said linearly increasing pressure is initiated at the scorch point.

11. An apparatus for determining the physical properties of vulcanizable elastomeric materials comprising a pair of spaced die members cooperable to define a test chamber and hold a sample of material therebetween; oscillating means operatively connected to one of said die members for oscillating said one die member relative to the other die member to provide a shearing force on said sample received by said test chamber; measuring means operatively connected to said oscillating means for measuring said shearing force and providing an output signal therefrom; means to heat said die members; means operative to receive said output signal for indicating its progressive value; air cylinder means operatively interconnecting said die members to move said other die member toward said one member into cooperative engagement with a test sample held in said test chamber to provide a pressure thereon, control means connected to said air cylinder means to provide a primary pressure followed by a secondary programmed pressure, said control means for said programmed pressure to said air cylinders includes an integrator circuit and a current control circuit, said integrator circuit provides an increasing input signal to said current control circuit, a pneumatic booster relay operatively connected to said air cylinder means to provide an input thereto, an electric-to-pneumatic transducer operative in said control circuit to receive the output from said current control circuit and to provide a control signal to said pneumatic booster relay to incremental linearly increase the air pressure to said air cylinder means upon actuation of said secondary pressure, said secondary pressure being linearly increased to a predetermined pressure.

12. A method for determining physical properties of elastomeric materials comprising: subjecting a sample of material to a first confining pressure, heating such sample to a predetermined temperature thence subjecting said confined heated sample to oscillating shearing strains from an input source having predetermined constant rate and amplitude of oscillation, measuring the torsional resistance to said shearing strains, subjecting said sample of material to a second pressure different than said first pressure which second pressure is a controlled programmed pressure linearly increasing to a predetermined maximum.

13. A method for determining physical properties of elastomeric materials as set forth in claim 12 wherein said second pressure is held constant for a predetermined period of time.

14. A method for determining physical properties of elastomeric materials comprising: subjecting a confined sample of material to a first pressure for a predetermined period of time, heating such sample to a predetermined temperature, subjecting said confined heated sample to oscillating shearing strain from an input source, subjecting said sample of material to a secondary linear increasing confining pressure after elapse of said predetermined time while being subjected to said oscillating shearing strain; and measuring the torsional resistance to these shearing strains.

15. The method for determining the physical properties as set forth in claim 14 wherein said secondary pressure is for a predetermined time interval.

16. The method for determining the shearing torque as set forth in claim 15 wherein said subjecting of said sample of material to said secondary pressure is after the scorch point of the material is reached.

* * * * *

UNITED STATES PATENT OFFICE
CERTIFICATE OF CORRECTION

Patent No. 3,688,568　　　　　　　　　Dated September 5, 1972

Inventor(s) Paul W. Karper, John P. Porter

It is certified that error appears in the above-identified patent and that said Letters Patent are hereby corrected as shown below:

Column 7, line 38, the word "face" should be ---fact---.

Column 9, line 35, (Claim 4), delete [a].

Column 11, lines 6 and 7 (Claim 12), delete [linearly increasing to a predetermined maximum].

Column 11, line 6 (Claim 12), before the word "pressure" insert ---linearly increasing to a predetermined maximum---.

Signed and sealed this 13th day of March 1973.

(SEAL)
Attest:

EDWARD M. FLETCHER, JR.
Attesting Officer

ROBERT GOTTSCHALK
Commissioner of Patents